H. A. & T. S. FRANTZ & W. H. TROXELL.
FERTILIZER ATTACHMENT TO CULTIVATORS.
APPLICATION FILED JULY 1, 1912.
1,053,945.
Patented Feb. 18, 1913.
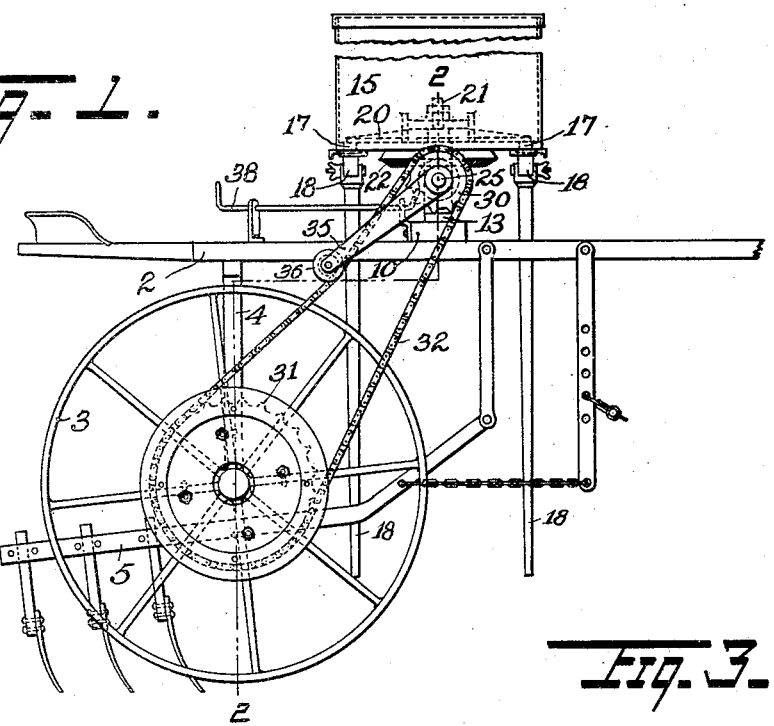
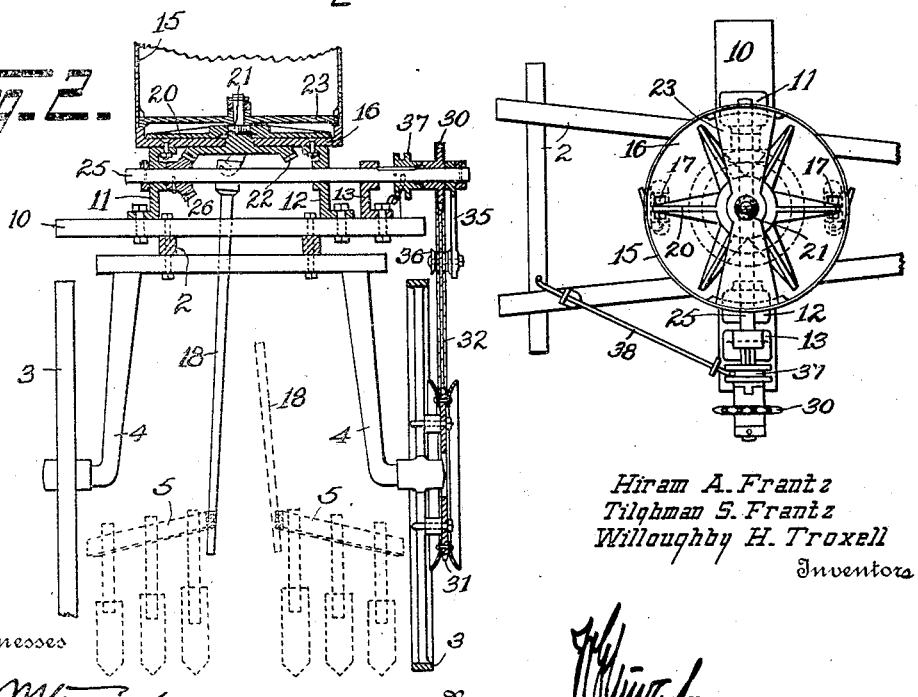
Hiram A. Frantz
Tilghman S. Frantz
Willoughby H. Troxell
Inventors

UNITED STATES PATENT OFFICE.

HIRAM A. FRANTZ, OF CHERRYVILLE, AND TILGHMAN S. FRANTZ AND WILLOUGHBY H. TROXELL, OF NEAR COPLAY, PENNSYLVANIA, ASSIGNORS TO KEYSTONE ATTACHMENT CO., OF CHERRYVILLE, PENNSYLVANIA, A COPARTNERSHIP COMPOSED OF HIRAM A. FRANTZ, TILGHMAN S. FRANTZ, AND WILLOUGHBY H. TROXELL.

FERTILIZER ATTACHMENT TO CULTIVATORS.

1,053,945.

Specification of Letters Patent. Patented Feb. 18, 1913.

Application filed July 1, 1912. Serial No. 706,852.

*To all whom it may concern:*

Be it known that we, HIRAM A. FRANTZ, TILGHMAN S. FRANTZ, and WILLOUGHBY H. TROXELL, all citizens of the United States, and residents, respectively, of Cherryville, Northampton county, and near Coplay, Lehigh county, all in the State of Pennsylvania, have invented certain new and useful Improvements in Fertilizer Attachments to Cultivators, of which the following is a specification.

Our invention relates to an improved fertilizer attachment for cultivators, in which the fertilizer hopper is mounted directly upon the traction frame of the cultivator and the feed spider thereof is adapted to be operated as desired by a drive belt carried by one of the supporting wheels of the cultivator; the improved arrangement of the fertilizer mechanism in connection with the cultivator being fully described by reference to the accompanying drawing, and the novel features being specifically pointed out in the claims.

Figure 1 is a side elevation showing a portion of a cultivator of known general construction, having our invention applied thereto. Fig. 2 is a cross-sectional view on the line 2—2 of Fig. 1. Fig. 3 is a partial plan view.

The drawing indicates the traction frame 2 of a riding cultivator, the supporting wheels 3 loosely mounted on fixed axle arms 4, and the gang beams 5 having upwardly inclined forward portions pivotally connected to the traction frame.

In our improved construction the fertilizer mechanism is mounted directly upon the traction frame 2, a cross-beam 10 being provided upon the latter to which are secured standards 11, 12 and 13 as shown, and the fertilizer hopper 15 being fixed upon the standards 11 and 12 midway of the width of the frame. The hopper bottom 16 is provided with feed outlets 17 and valved discharge spouts 18 extending therefrom to properly located delivery terminals, and the feed-spider 20 within it is engaged upon the upwardly extended angular hub 21 of a gear wheel 22 by which it is rotated so as to insure uniform delivery of the fertilizer, said gear wheel being carried, as indicated, by the fixed outlet cover plate 23 within the hopper.

The driving mechanism for the feed-spider 20 comprises a transversely arranged drive shaft 25, which is rotatably mounted in suitable bearings in the standards 11, 12, and 13, and is provided with a pinion wheel 26 arranged in mesh with the gear wheel 22 of the spider and with a belt wheel 30 adjacent its outer end. This shaft 25 is driven directly from one of the supporting wheels 3 of the cultivator, said wheel having centrally fixed to the side thereof a flanged belt wheel 31 from which a drive belt 32 extends to the shaft wheel 30. The shaft 25 carries a swinging arm 35 having an idler pulley 36 at the free end thereof to take up the slack of the drive belt; and the shaft wheel 30 is mounted loosely on the shaft, as shown, and is fixed to or released from the latter by means of a sliding clutch 37 thereon, controlled by a conveniently arranged operating lever 38 therefor, so as to permit of throwing the feed spider out of action when desired.

It will be seen that our invention thus provides for a very simple application of the fertilizer mechanism to the cultivator and for the satisfactory operation of said mechanism simultaneously with the operation of the cultivator.

What we claim is:—

1. In combination with a cultivator comprising a traction frame, axle arms fixed thereto, and supporting wheels rotatable on said axle arms; a cross-beam on said frame; spaced standards on said beam provided with drive-shaft bearings; a fertilizer hopper fixedly mounted on said standards and provided with a bottom having discharge spouts; a fixed cover plate above said discharge spouts; a rotary feed-spider between said cover plate and the hopper bottom; a drive gear below said bottom having an angular hub engaged in said spider and bearing hubs journaled respectively in said hopper bottom and cover plate; a spider drive shaft mounted in said standards; and coöperating drive-belt wheels fixed respectively to said shaft and to one of said supporting wheels, substantially as set forth.

2. In combination with a cultivator comprising a traction frame, axle arms fixed thereto, and supporting wheels rotatable on said axle arms; a cross-beam on said frame;

spaced standards on said beam provided with drive-shaft bearings; a fertilizer hopper fixedly mounted on said standards and provided with a bottom having discharge spouts and with a rotary feed-spider upon the bottom thereof having a drive gear therefor below said bottom; a spider drive shaft mounted in said standards; a drive-belt wheel fixed to one of said supporting wheels; a coöperating drive-belt wheel loosely mounted on said shaft; and a clutch mechanism for fixing or releasing said shaft drive wheel, substantially as set forth.

In testimony whereof, we affix our signatures, in the presence of two witnesses.

HIRAM A. FRANTZ.
TILGHMAN S. FRANTZ.
WILLOUGHBY H. TROXELL.

Witnesses:
H. H. HOWER,
A. H. HAHN.